G. A. OLSON.
STANCHION.
APPLICATION FILED OCT. 29, 1914.

1,165,999.

Patented Dec. 28, 1915.
2 SHEETS—SHEET 1.

Witnesses.
A. H. Opsahl.
E. C. Skinkle.

Inventor.
Gustav A. Olson.
By his Attorneys
Williamson & Merchant

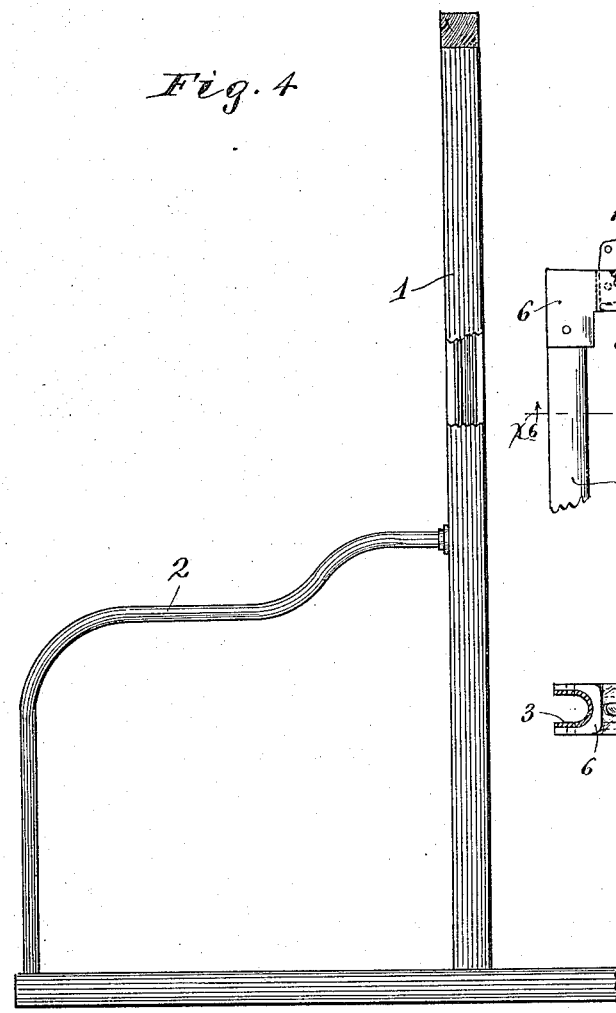
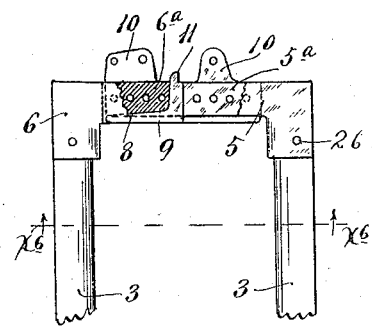

UNITED STATES PATENT OFFICE.

GUSTAV A. OLSON, OF ALBERT LEA, MINNESOTA.

STANCHION.

1,165,999.          Specification of Letters Patent.        Patented Dec. 28, 1915.

Application filed October 29, 1914. Serial No. 869,211.

*To all whom it may concern:*

Be it known that I, GUSTAV A. OLSON, citizen of the United States, residing at Albert Lea, in the county of Freeborn and State of Minnesota, have invented certain new and useful Improvements in Stanchions; and I do hereby declare the following to be a full, clear, and exact description of the invention, such as will enable others skilled in the art to which it appertains to make and use the same.

My invention has for its object to provide a highly efficient stanchion for the well-known purpose of securing stock in their stalls; and, to this end, it consists of the novel devices and combinations of devices hereinafter described and defined in the claims.

In the accompanying drawings, which illustrate the invention, like characters indicate like parts throughout the several views.

Figure 1:
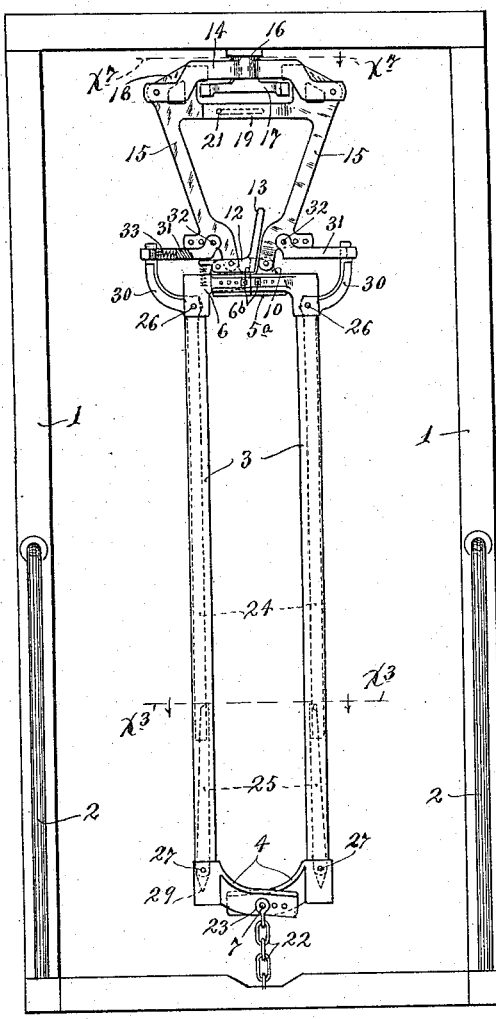
Figure 2:
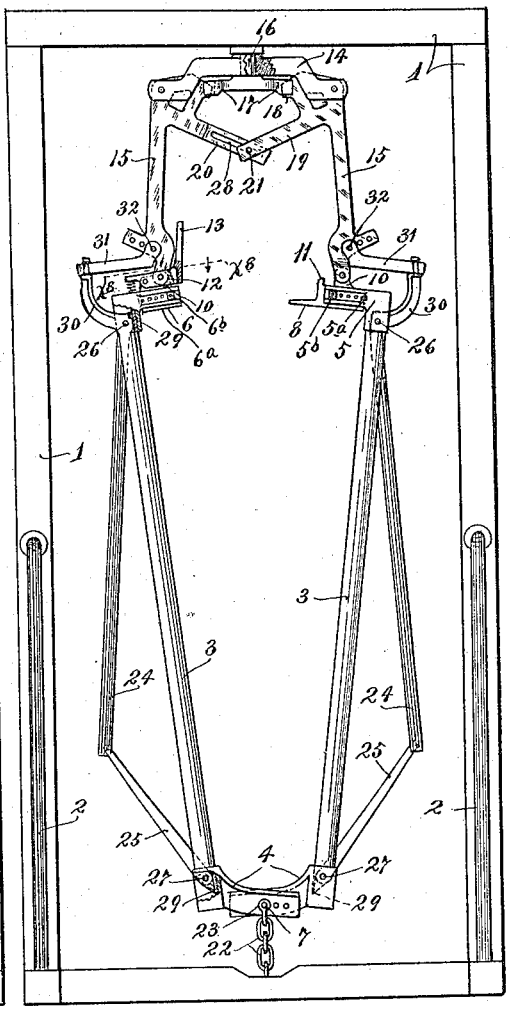
Figure 3:
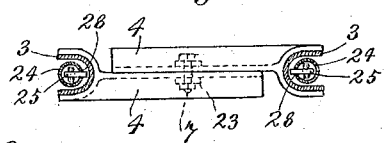

Referring to the drawings, Figure 1 is a view of the improved stanchion in elevation attached in working position within a stall structure; Fig. 2 is a view corresponding to Fig. 1, with the exception that the improved stanchion is shown in an open or spread position; some parts being broken away and some of the exposed parts being shown in section; Fig. 3 is a horizontal section taken on the line $x^3$ $x^3$ of Fig. 1, on an enlarged scale; Fig. 4 is a view of the stall structure in side elevation some parts being broken away; Fig. 5 is a fragmentary view, in elevation, of the upper end portion of the improved stanchion, some parts being broken away and some of the exposed parts being shown in section; Fig. 6 is a horizontal section taken on the line $x^6$ $x^6$ of Fig. 5; Fig. 7 is a detail view, partly in plan and partly in horizontal section, taken on the line $x^7$ $x^7$ of Fig. 1, on an enlarged scale; Fig. 8 is a detail view, partly in plan and partly in section, taken on the line $x^8$ $x^8$ of Fig. 2, on an enlarged scale; and Fig. 9 is a detail view, on an enlarged scale, showing the method of connecting the extensible wing bars with their operating links.

The stall structure, as shown, comprises a rectangular frame 1, at the manger end of the stall, and stall dividers 2, in the form of bent pipes anchored at their forward ends to the vertical members of the frame 1 and at their rear ends to the floor of the stall.

The improved stanchion comprises a pair of horizontally spaced, upright bars 3, a pair of duplicate foot brackets 4, and coöperating head brackets 5 and 6. As shown, the bars 3 are of channel form with rounded bottoms and arranged with their flanges projecting outward so that said bottoms engage the neck of the animal held. The foot brackets 4 are rigidly secured, one to the lower end of each of the bars 3, and have inwardly and downwardly curved angle extensions. Said angle extensions are overlapped, with their vertical flanges in flat engagement, one with the other, and pivotally connected by a nut-equipped bolt 7. This bolt 7 affords a pivot on which the bars 3 swing during the closing and spreading of the stanchion. In each angle extension of the foot brackets 4 is formed a multiplicity of longitudinally spaced perforations, through any alined pair of which may be passed the bolt 7 for securing the bars 3, at their lower ends, in different set adjustments.

The top brackets 5 and 6 are rigidly secured to the upper ends of the bars 3, extend horizontally toward each other, and, when the stanchion is closed, meet at the vertical center thereof. The inner or free ends of the top brackets 5 and 6 are bifurcated and have mounted between the respective prongs thereof sliding blocks 5ª and 6ª, respectively. These sliding blocks are rigidly but adjustably secured for adjustments toward and from each other by nut-equipped bolts 5ᵇ and 6ᵇ seated in the prongs of the respective blocks 5ª and 6ª. Said bolts are adapted to be passed through any one of a multiplicity of longitudinally spaced perforations formed in said blocks. Oppositely projecting flanges on the sides of the blocks 5ª and 6ª engage the lower edges of the prongs of the respective heads 5 and 6 and thereby hold said blocks against vertical tilting movements.

Integrally formed with the block 5ª is an alining finger 8 adapted to enter a socket 9 formed in the block 6ª, when the stanchion is closed, and thereby secure said two blocks, and hence the upper ends of the bars 3, against lateral movement in respect to each other. An upwardly projecting lug 10 is integrally formed with each of the blocks 5ª and 6ª, and integrally formed with the alining finger 8 is an upwardly projecting lock lug 11. Coöperating with this lock lug 11 to hold the stanchion closed and locked around the neck of an animal, is a spring-pressed lock member 12. This lock member 12 is in the form of a horizontal loop which embraces the lug 10 on the block 6ª and is pivotally secured thereto for vertical lifting movement. When the top brackets 5 and 6 are brought together during the closing movement of the stanchion, the lock member 12 is engaged by the lock lug 11, and cammed thereby into a raised position to permit said lock lug to pass under the lock member 12 and be embraced thereby. Integrally formed with the inner end portion of the lock member 12 is an upwardly projecting finger-like extension 13, by which said lock member may be lifted out of engagement with the lock lug 11 to permit the stanchion to be spread and release the held animal.

By adjustably connecting the bottom brackets 4 and adjustably securing the blocks 5ª and 6ª to the top brackets 5 and 6, respectively, the bars 3 may be readily adjusted, in parallel arrangement, toward and from each other to vary the opening between the said bars to fit the neck of the animal held thereby.

The improved stanchion is suspended with freedom for oscillatory movement on the vertical axis by a supporting head 14 and a pair of hanger brackets 15. This supporting head 14 is intermediately swiveled for horizontal swinging movement to a depending stud 16, secured to the top transverse member of the frame 1. Integrally formed with the stud 16 is a pair of oppositely projecting lock detents 17, which extend in the plane of the frame 1, and the purpose of which will presently appear. The ends of the supporting head 14 are bifurcated and the upper ends of the hanger brackets 15 are pivotally secured thereto for horizontal swinging movement toward and from each other. The lower ends of the hanger brackets 15 are secured, one to each of the lugs 10. Obviously, these hanger brackets 15 permit free spreading and closing movements of the stanchion.

Integrally formed with the upper end portions of the hanger brackets 15 is a pair of inwardly projecting lock lugs 18, which extend in a plane between the prongs of the bifucated ends of the supporting head 14 and normally above the lock detents 17. During the spreading movement of the stanchion, the outward swinging movements of the lower ends of the hanger brackets 15 carry the lock lugs 18 into the detents 17, thereby securing the stanchion against oscillatory movement and in the plane of the frame 1. Also integrally formed with the hanger bracket 15 is a pair of coöperating guide arms 19 and 20, which hold the said hanger brackets against lateral twisting movement, one in respect to the other. The arm 19 is bifurcated to receive, with sliding movement, the arm 20. These arms 19 and 20 are connected by a slot and pin connection 21. A short chain 22, anchored to the lower end of the stanchion by a clevis 23, secured to the bolt 7, and to the floor in axial alinement with the stud 16, permits a limited oscillatory movement of the stanchion, but will hold the lower end thereof against any appreciable horizontal swinging movement.

To prevent the animal from poking its head between the uprights of the frame 1 and the stanchion proper, instead of through the stanchion, is provided a fencing in the form of a pair of extensible wings. There is one of these extensible wings carried by each of the bars 3 and, when the stanchion is closed, they are folded within said bars, but, when the stanchion is spread, they extend into the space between the stanchion and the uprights of the frame structure 1. Each of these extensible wings comprises a depending tubular member 24 and an upwardly projecting flat bar member 25. The wing members 24 are pivotally secured at 26 to the upper ends of the bars 3, and the wing members 25 are pivotally secured at 27 to the lower ends of the bars 3. Both members of each wing are flexibly connected by slidably mounting the free ends of the members 25 in the free tubular ends of the members 24. To permit angular movements of the wing members with respect to each other, the members 24 are slotted at 28 to receive the members 25. It will also be noted that the free ends of the wing members 25 are expanded to prevent their lateral separation from the wing members 24 through the slots 28. Stop shoulders 29 on the pivoted ends of the wing members 24 and 25 engage the bars 3 to limit the outward swinging movement of said members and to prevent the wing members 25 from pulling endwise out of the wing members 24.

With the upper end of each wing member 24 is integrally formed an outwardly and upwardly curved extension 30. Links 31 connect these extensions 30 with the lower end portions of the hanger brackets 15. The links 31 are connected to the extensions 30 by bayonet joints and to the hanger brackets 15 by pins 32, adapted to be passed through any one of a multiplicity of perforations formed in said hanger brackets. Coiled springs 33, mounted in the links 31, engage the extensions 30 and yieldingly press the wing members 24 into the channels of the bars 3. The purpose of adjustably connecting the links 31 to the hanger brackets 15 is to vary their operative length, to compensate for the adjustment of the blocks 5ª and 6ª with respect to the heads 5 and 6.

By reference to Figs. 1 and 2 it will be noted that the lower end portions of the hanger brackets 15 are curved inwardly and downwardly, and, by forcing a fork handle or other tool between the lock finger 13 and the hanger bracket 15 which is connected to the bracket 5, said finger will be cammed away from said hanger bracket and thereby lift the lock member 12 out of engagement with the lock lug 11.

What I claim is:—

1. The combination with the stall structure, of a stanchion mounted in the stall structure, a lock for securing the stanchion against spreading movement, a fixed support, a hanger head swiveled to the support, hanger brackets pivotally connecting the stanchion to the hanger head, for oscillatory movement on a vertical axis, and coöperating lock elements on the support and hanger brackets, said lock elements arranged to be rendered operative by the spreading movement of the stanchion to lock the same against oscillatory movement when spread.

2. The combination with a stall structure, of a stanchion, mounted in said stall structure and including a pair of horizontally-spaced channel bars connected for spreading movement to open said stanchion, means for locking said stanchion closed, extensible wing bars folded in the channel bars of said stanchion, and means actuated by the spreading movement of said stanchion to project said wings.

3. The combination with a stall structure, of a stanchion, mounted in said stall structure and including a pair of horizontally-spaced upright channel bars, connected at their lower ends for spreading movement to open said stanchion, means for locking said stanchion closed, hanger brackets suspending said stanchion with freedom for oscillatory movement on a vertical axis, extensible wing bars folded in the channel bars of said stanchion, and connections from said hanger brackets to said wing bars for projecting said wing bars when the stanchion is spread.

4. The combination with a stall structure, of a stanchion, mounted in said stall structure and including a pair of horizontally-spaced upright channel bars, connected at their lower ends for spreading movement to open said stanchion, means for locking said stanchion closed, a swiveled hanger head, hanger brackets pivotally connecting said stanchion to said hanger head for oscillatory movement on a vertical axis, extensible wing bars folded in the channel bars of said stanchion, and links connecting said hanger brackets to said wing bars for projecting said wing bars when the stanchion is spread.

5. The combination with a stall structure, of a stanchion, mounted in said stall structure and including a pair of horizontally-spaced upright channel bars, connected at their lower ends for spreading movement to open said stanchion, means for locking said stanchion closed, a swiveled hanger head, hanger brackets pivotally connecting said stanchion to said hanger head for oscillatory movement on a vertical axis, extensible wing bars folded in the channel bars of said stanchion, links connecting said hanger brackets to said wing bars, whereby said wing bars will be projected when the stanchion is spread, and normally-separated interlocking elements on the support for said hanger head and hanger brackets, said lock elements arranged to be rendered operative by the spreading movement of the stanchion to lock the same against oscillatory movement when spread.

6. The combination with a stall structure, of a stanchion, mounted in said stall structure and adapted to be spread to open the same, a lock for securing the stanchion against spreading movement, a pair of oppositely acting extensible upright wing bars pivotally connected at their ends to said stanchion and flexibly connected at their intermediate portions, and means actuated by the spreading movement of said stanchion to project said wing bars.

7. The combination with a stall structure, of a stanchion, mounted in said stall structure and comprising a pair of horizontally-spaced upright bars, foot brackets pivotally connecting the lower ends of said bars, and a pair of coöperating head brackets on the upper ends of said bars, coöperating lock elements on said head brackets for holding said stanchion closed, a swiveled head support, hanger brackets pivotally attached to said head support and supporting said stanchion with freedom for closing and spreading movements, and an anchor, flexibly connecting the lower ends of said stanchion to a fixed support.

8. The combination with a stall structure, of a stanchion, mounted in said stall structure and comprising a pair of horizontally-spaced upright bars, foot brackets pivotally connecting the lower ends of said bars, and a pair of coöperating head brackets on the upper ends of said bars, coöperating lock elements on said head brackets for holding said stanchion closed, a stud, having lock detents, secured to an overhead support, a head support swiveled to said stud, hanger brackets supporting said stanchion from said supporting head with freedom for closing and spreading movements, an anchor, flexibly connecting the lower end of said stanchion to a fixed support, and lock lugs on said hanger brackets engageable with the lock detents of said stud, when said stanchion is spread, to lock the same against oscillatory movement on a vertical axis.

9. The combination with a stall structure, of a stanchion, mounted in said stall structure and comprising a pair of horizontally-spaced upright bars, foot brackets, pivotally connecting the lower ends of said bars, and a pair of coöperating head brackets on the upper ends of said bars, coöperating lock elements on said head brackets for holding said stanchion closed, a stud, having lock detents, secured to an overhead support, a head support swiveled to said stud, hanger brackets supporting said stanchion from said supporting head with freedom for closing and spreading movements, an anchor, flexibly connecting the lower end of said stanchion to a fixed support, lock lugs on said hanger brackets, engageable with the lock detents of said stud, when said stanchion is spread, to lock the same against oscillatory movement on a vertical axis, and coöperating guide arms on said hanger brackets.

In testimony whereof I affix my signature in presence of two witnesses.

GUSTAV A. OLSON.

Witnesses:
 HERMAN BLACKMER,
 FERMAS BUTLER.

Copies of this patent may be obtained for five cents each, by addressing the "Commissioner of Patents, Washington, D. C."